United States Patent [19]
Holt

[11] 4,115,271
[45] Sep. 19, 1978

[54] ROTARY DRUM SCREEN
[75] Inventor: William H. Holt, Lewiston, N.Y.
[73] Assignee: The Carborundum Company, Niagara Falls, N.Y.
[21] Appl. No.: 727,704
[22] Filed: Sep. 29, 1976
[51] Int. Cl.² .......................................... B01D 33/36
[52] U.S. Cl. ................................. 210/247; 209/285; 210/396; 210/402
[58] Field of Search ............... 209/285, 286; 210/247, 210/396, 402

[56] References Cited
U.S. PATENT DOCUMENTS

| | | | |
|---|---|---|---|
| 1,064,702 | 6/1913 | Breakell | 210/402 X |
| 2,294,179 | 8/1942 | Hawley | 210/396 X |
| 3,876,548 | 4/1975 | Welles, Jr. | 210/402 X |

Primary Examiner—Frank A. Spear, Jr.
Assistant Examiner—Richard W. Burks

[57] ABSTRACT

A structure for dewatering solids utilizing a rotating cylindrical screen wherein the solids and water are directed to a portion of the rotating screen with the water passing into the interior of the screen and the solids adhering to the external surface of the screen. Doctor means remove substantially all of the solids from the external surface of the screen, after which the screen is washed by the water which has entered into the screen, the water being directed by a baffle into a flowing stream which strikes the screen and passes therethrough in a concentrated mass. The baffle is fixedly carried by a fixed shaft on which the screen is mounted for rotation.

8 Claims, 5 Drawing Figures

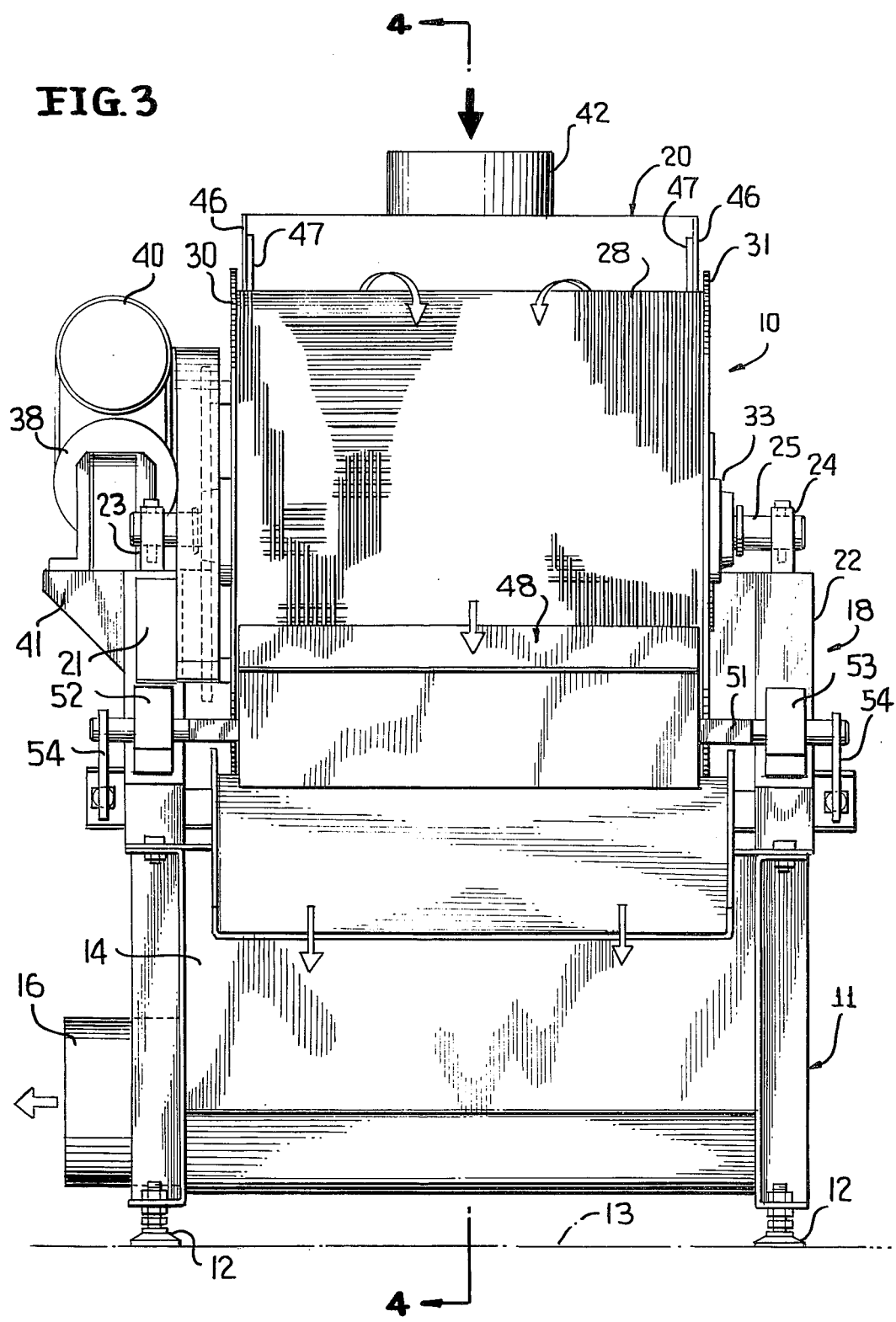

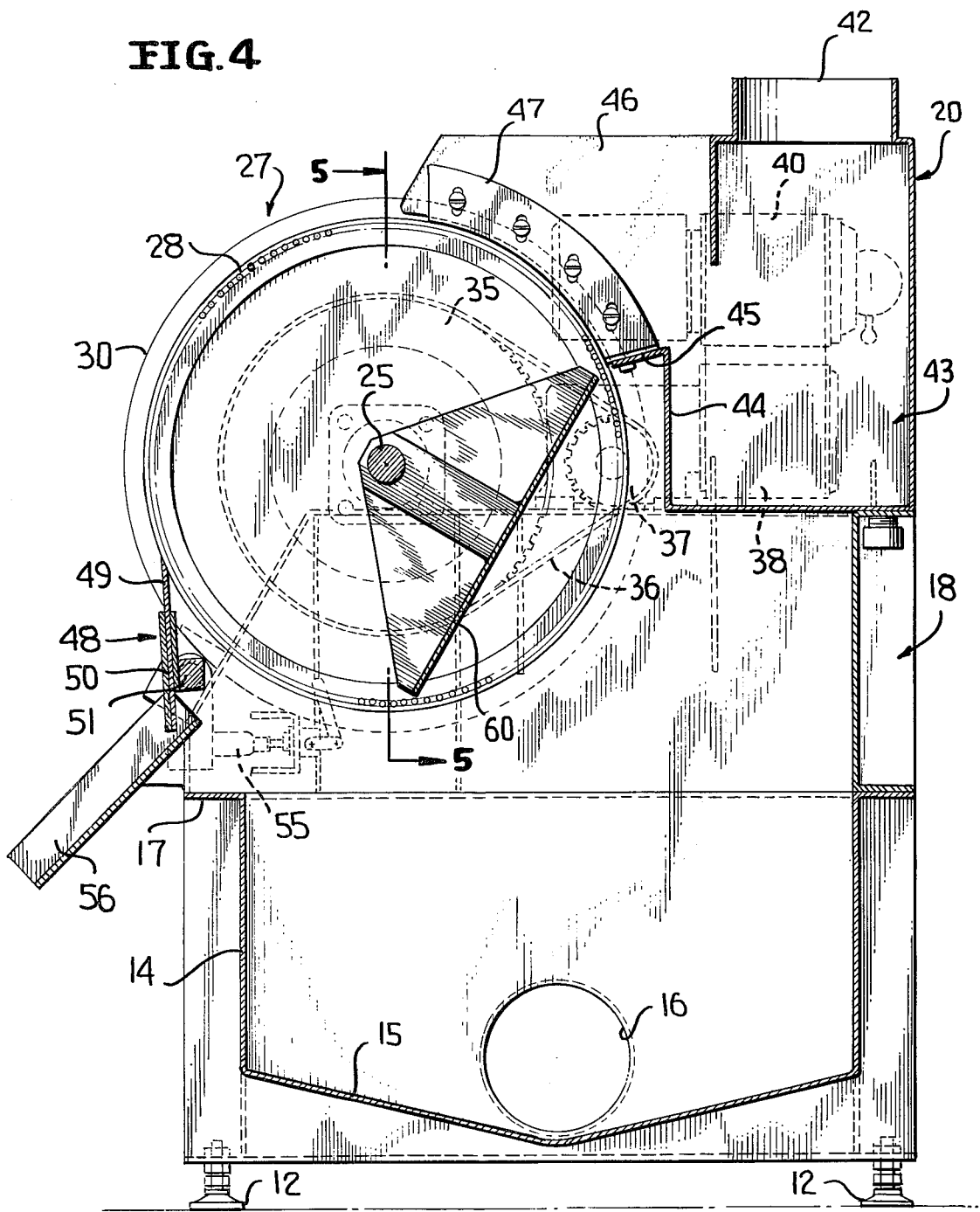

ROTARY DRUM SCREEN

This invention relates to a rotary drum screen which is particularly operable for dewatering solids and which screen is continuously cleaned during the use thereof.

The closest known prior art is the patent to Donald P. Welles, Jr., U.S. Pat. No. 3,876,548, granted Apr. 8, 1975. This patent teaches that the solids should be removed from the exterior surface of the screen by means of a suitable external wiper and that subsequent to the wiping operation, the wiped portion of the screen should be further cleansed by the water removed from the solids, which water flows into the interior of the screen and there out of to effect the washing operation.

Although the Welles' patent does disclose the use of baffles for concentrating the flow of the water, the water is directed to the screen as free flowing water engaging in the screen over a relatively wide area wherein the water does not have the proper force reaction to effect an optimum cleaning.

In accordance with this invention, there is mounted within the rotating screen a fixed baffle which slopes downwardly in underlying relation to the falling water passing through the screen so as to receive that water and to provide for a controlled downward flowing of the water as a flowing stream, the flowing stream engaging the interior of the screen over a relatively narrow area so as to provide an effective concentrated cleaning force.

One of the difficulties with the utilization of a baffle is the mounting thereof within a rotating screen. The mounting of the baffle has been solved by utilizing a fixed shaft on which the screen is mounted for rotation and fixedly securing the baffle to the fixed shaft.

Another feature of the invention is that the mount of the baffle in a fixed position within the screen employs mounting plates which are fixedly secured to the baffle at opposite ends thereof, which mounting plates, together with the baffle define a trough down through which the water flowing into the interior of the rotating screen, flows. Thus the concentration of the water into a flowing stream may be better effected.

A further feature of the invention is that the baffle which effects the flow of the water within the rotating screen as a flowing stream has a downwardly sloping relationship with respect to the screen and the direction of rotation thereof such that the flowing stream of water has a horizontal force component opposed to the horizontal component of the direction of rotation of the screen at the point of impact of the water against the screen thereby effecting a more efficient cleaning operation.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 3 is a front elevational view of the device and shows the overall arrangement of the various components thereof.

FIG. 4 is a transverse vertical sectional view taken along the line 4—4 of FIG. 3 and shows more specifically the constructional details of the device.

Figure 1:
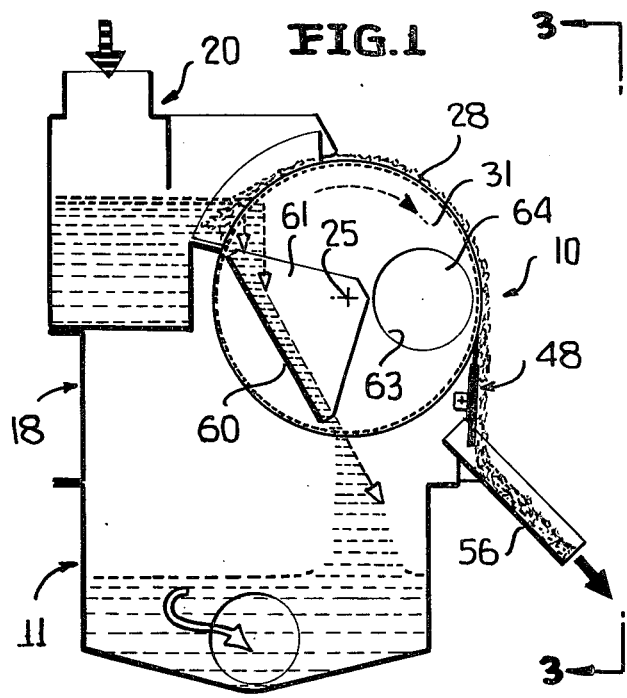
FIG. 1 is a schematic sectional view through the rotary drum screen which is the subject of this invention and shows the various flow paths therein.

The rotary drum screen device is generally identified in the drawings by the numeral 10 and includes a supporting base, generally identified by the numeral 11. The supporting base 11 is provided with four adjustable feet 12 so as to facilitate the leveling thereof with respect to a support surface 13, such as a floor, etc. As is best shown in FIG. 4, the base 11 defines an effluent trough 14 having a sloping bottom 15 and a discharge 16. The base 11 terminates at its upper end in an upwardly facing peripheral flange 17.

Suitably mounted on the base 11 is an intermediate frame member 18 on which there is, in turn, mounted a head box 20. The frame member 18 is of a tubular construction and in effect forms an upper extension of the effluent trough.

Figure 5:
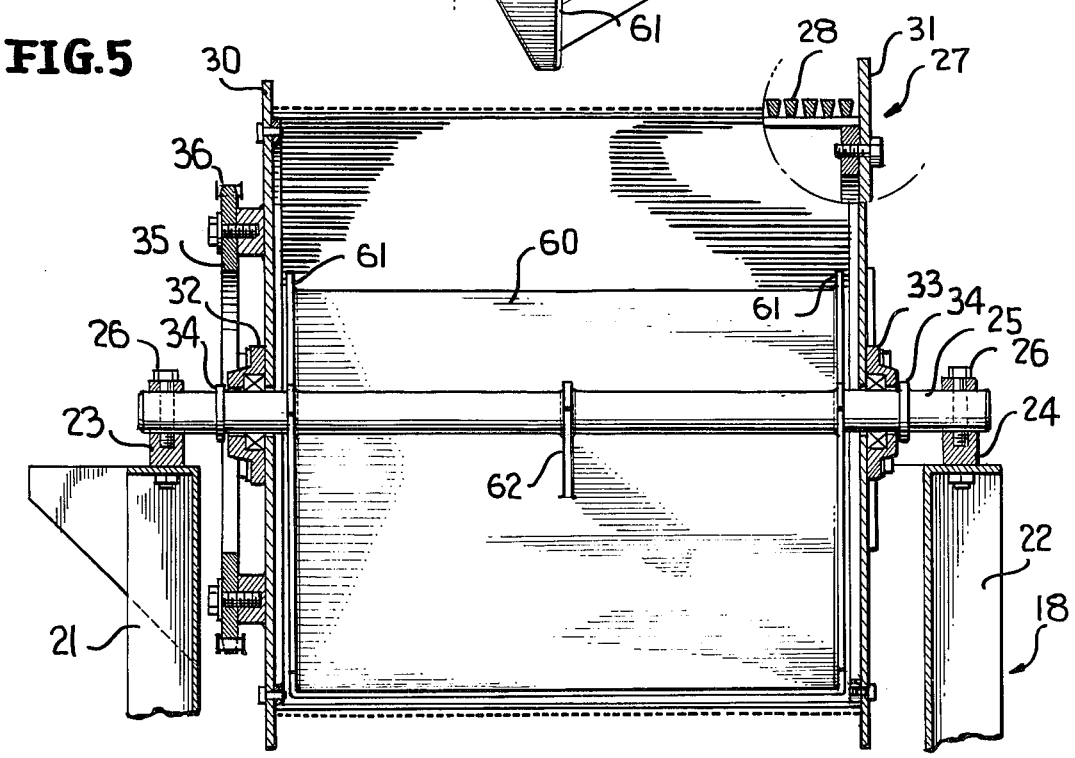
FIG. 5 is a fragmentary longitudinal sectional view taken along the line 5—5 of FIG. 4 and shows further the constructional details of the screen and the manner in which it is mounted.

Referring now to FIGS. 3 and 5, it will be seen that the intermediate frame member 18 includes remote end frame members 21 and 22 which have removably secured thereto mounts 23, 24 for a horizontal shaft 25 which extends longitudinally of the device. The shaft 25 is fixedly mounted against rotation in a predetermined angular relationship by means of pin elements 26 which extend down through the mounts 23, 24, through the end portions of the shaft 25, and are threaded into the lower portions of the mounts 23, 24.

A cylindrical screen assembly, generally identified by the numeral 27, is mounted on the shaft 25 for rotation relative thereto. The screen assembly 27 may include a conventional cylindrical screen 28 which has removably secured to the opposite ends thereof end plates 30, 31. The end plate 30 is provided with a bearing unit 32 which is rotatably journaled on the left portion of the shaft 25. In a like manner, the end plate 31 is provided with a bearing assembly 33 which is rotatably journaled on the right portion of the shaft 25. The screen assembly 27 is fixed axially on the shaft 25 by means of a pair of collars 34 carried by the shaft 25.

The end plate 30 is provided with a driven sprocket 35 on which there is entrained a drive chain 36. The drive chain 36, in turn, is entrained over a drive sprocket 37 (FIG. 4) which is carried by a reduction gear unit or speed reducer 38 associated with a drive motor 40. The drive unit, which includes the reduction gear unit 38 and the motor 40, is suitably mounted on a mounting bracket 41 (FIG. 3) which is part of the frame member 18.

The head box 20 includes an inlet 42 and the lower portion thereof is in the form of a sump 43 which has a relatively short wall 44 opposing the drum assembly 27. The upper edge of the wall 44 functions as a weir and terminates in an outwardly and downwardly directed flow control flange 45.

The head box 20 also includes a pair of splash plates 46 which extend towards the screen assembly 27 and which carry a pair of seals 47 which engage the surface of the cylindrical screen 28 between the end plates 30, 31 to control the flow of water through the cylindrical screen 28 and the flow of solids onto the exterior surface of the cylindrical screen 28.

In order to facilitate the removal of solids from the external surface of the cylindrical screen 28, the device 10 also includes a doctor assembly, generally identified by the numeral 48. The doctor assembly 48 includes a doctor blade 49 carried by a holder 50 which, in turn, is carried by a shaft 51 having the ends thereof rotatably journaled in mounting members 52, 53 (FIG. 3) carried by the frame members 21, 22. The opposite ends of the shaft 51 are provided with arms 54 fixedly secured thereto with there being associated with each of the arms 54 an adjustable positioning device 55, best shown in FIG. 4.

The solids accumulated on the external surface of the cylindrical screen 28 are removed therefrom by the action of the doctor 49 and the solids flow down the doctor 49 and into a discharge trough 56.

It is to be understood that the mixture of solids and water flowing out of the head box 20 over the flange 45 will flow against the upper portion of the rotating cylindrical screen 28, as is diagrammatically illustrated in FIG. 1. The solids which do not pass between the bars of the cylindrical screen 28 adhere to the outer surface thereof and rotate with the cylindrical screen 28. The water and fines which pass through the cylindrical screen 28 flow down into the interior of the screen. Normally the water would pass down through the screen as a light spray under a gravitational force and pass out of the lower portion of the cylindrical screen 28 into the effluent trough 11. Such gravity falling water would have a minimal cleaning effect on the cylindrical screen 28.

In accordance with this invention, there is mounted within the cylindrical screen 28 in a fixed position a baffle or deflector 60. The baffle or deflector 60 is fixedly secured to the fixedly mounted shaft 25 by means of a pair of end plates 61 which are generally triangular in outline and may be integrally formed with the end edges of the baffle 60. It will be seen that the end plates 61, which function as mounting members for the baffle 60, combine with the baffle or deflector 60 to form a trough. The central portion of the baffle 60 is supported from the shaft 25 by means of a sheet-like brace 62.

Figure 2:
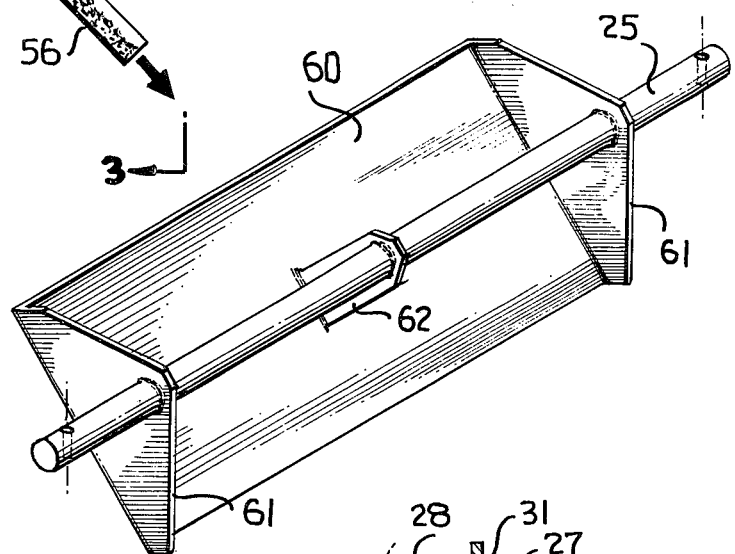
FIG. 2 is an enlarged perspective view of the baffle and the shaft which supports both the baffle in its fixed position and the screen for rotation.

It will be readily apparent from FIG. 2 that the shaft 25 and the baffle 60 are rigidly interconnected in a fixed relationship. Further, it will be apparent from the aforedescribed mounting of the shaft 25 that the shaft 25 is fixed against rotation or pivoting. Thus when the shaft 25 is mounted with the remainder of the device, the baffle 60 is disposed in a fixed position within the screen assembly 27, as is clearly shown in FIG. 5.

As will be apparent from the schematic showing of FIG. 1, the upper portion of the baffle 60 underlies the water which flows downwardly through the screen 28. Instead of this water being permitted to fall as a spray, it is engaged by the baffle 60 and deflected downwardly and to the right with the accumulating water forming a downwardly flowing stream. Such a stream of water engages the cylindrical screen 28 throughout an area of relatively narrow width and thus is applied to the screen as a concentrated force so as to become more effective in its washing operation. It is to be particularly noted that the flowing stream of water engages the internal surface of the cylindrical screen 28 beyond that point in the direction of rotation of the cylindrical screen 28 from the doctor assembly 48. Thus the flowing stream of water is effective to remove the solids remaining on the external surface of the cylindrical screen 28 after the doctoring operation.

It is also pointed out here that the flowing stream of water engages the internal surface of the cylindrical screen 28, as shown in FIG. 1, with the stream having a horizontal component to the right while the horizontal component of the rotation of the cylindrical screen 28 at the point of engagement by the water is to the left. This provides for a maximum force application which contributes to the cleansing of the screen 28.

In order that the baffle 60 and the mounting elements therefore, as well as the shaft 25 within the cylindrical screen 28 may be periodically cleansed, the end plate 31 is provided with an access opening 63 which is normally closed by a cover plate 64.

It has been found that the guiding of the water entering into the cylindrical screen 28 by means of the baffle or deflector 60 so as to become in the form of a flowing screen has resulted in a more effective cleaning of the external surface of the cylindrical screen after the solids have been removed by means of a doctor assembly 48. Accordingly, the guidance of the water within the cylindrical screen has proved to be beneficial. It will be also apparent that the mounting of the baffle or deflector 60 within the cylindrical screen in a fixed position has become relatively simple by the mounting of the shaft 25 in fixed relation and the journaling of the screen assembly 27 thereon.

Although only a preferred embodiment of the device has been specifically illustrated and described herein, it is to be understood that minor variations may be made in the device without departing from the spirit and scope of the invention, as defined by the appended claims.

I claim:

1. A structure for removing entrained solids from a liquid, said structure comprising a generally cylindrical screen, means for effecting rotation of said screen about an axis in a selected direction, supply means for directing flowing liquid and solids onto said screen throughout a preselected portion of its rotation with the liquid passing into the interior of said screen primarily only in an upper quadrant of the rotation of said screen wherein said screen is moving upwardly and screened-out solids remaining on the exterior of said screen, doctor means displaced from said supply means in the direction of rotation of said screen for removing solids from the exterior of said screen, and single flow directing means located within the interior of said screen for directing essentially all of the liquid passing into the interior of said screen through the interior of the screen and out through a lower portion of said screen between said doctor means and said supply means in the form of a concentrated flowing stream, said flow directing means being in the form of a downwardly sloping stream supporting and defining baffle fixedly mounted within said screen, said sloping baffle having an upper portion underlying said preselected portion of said screen rotation and a lower end terminating adjacent the interior of said screen.

2. The structure of claim 1 wherein there are mounting means fixedly mounting said baffle, said mounting means including a shaft supporting said screen for rotation, means fixedly mounting said shaft against rotation, and mounting elements fixedly secured to both said baffle and said shaft.

3. The structure of claim 2 wherein said means fixedly mounting said shaft include seat means receiving remote end portions of said shaft, and pin means between at least one end portion of said shaft and the respective one of said seat means preventing rotation of said shaft.

4. The structure of claim 2 wherein said screen has axially spaced end plates, said shaft extending entirely through said screen and axially beyond said end plates, and having means carried by said end plates rotatably journaled on said shaft.

5. A structure for removing entrained solids from a liquid, said structure comprising a generally cylindrical screen, means for effecting rotation of said screen about an axis in a selected direction, supply means for directing flowing liquid and solids onto said screen throughout a preselected portion of its rotation with the liquid passing into the interior of said screen and screened-out solids remaining on the exterior of said screen, doctor means displaced from said supply means in the direction of rotation of said screen for removing solids from the exterior of said screen, and flow directing means within the interior of said screen for directing liquid passing into the interior of said screen through the interior of the screen and out through a lower portion of said screen between said doctor means and said supply means in the form of a flowing stream, said flow directing means being in the form of a downwardly sloping stream supporting and defining baffle fixedly mounted within said screen, said sloping baffle having an upper portion underlying said preselected portion of said screen rotation and a lower end terminating adjacent the interior of said screen, said baffle extending generally axially of said screen and having axially spaced ends, and upstanding end plates at said baffle ends combining with said baffle to define a trough.

6. The structure of claim 5 wherein said end plates also form mounting means for said baffle.

7. The structure of claim 6 wherein there is a shaft supporting said screen for rotation, means fixedly securing said end plates to said shaft, and means fixedly mounting said shaft against rotation.

8. A structure for removing entrained solids from a liquid, said structure comprising a generally cylindrical screen, means for effecting rotation of said screen about an axis in a selected direction, supply means for directing flowing liquid and solids onto said screen throughout a preselected portion of its rotation with the liquid passing into the interior of said screen and screened-out solids remaining on the exterior of said screen, doctor means displaced from said supply means in the direction of rotation of said screen for removing solids from the exterior of said screen, and flow directing means within the interior of said screen for directing liquid passing into the interior of said screen through the interior of the screen and out through a lower portion of said screen between said doctor means and said supply means in the form of a flowing stream, the slope and position of said flow directing means relative to said screen and the direction of rotation of said screen being such that the flowing stream of liquid will have a horizontal flow component opposing the horizontal direction of rotation of said screen.

* * * * *